United States Patent
Weng

(10) Patent No.: US 9,754,113 B2
(45) Date of Patent: Sep. 5, 2017

(54) METHOD, APPARATUS, TERMINAL AND MEDIA FOR DETECTING DOCUMENT OBJECT MODEL-BASED CROSS-SITE SCRIPTING ATTACK VULNERABILITY

(71) Applicant: TENCENT TECHNOLOGY (SHENZHEN) COMPANY LIMITED, Shenzhen, Guangdong (CN)

(72) Inventor: Jiacai Weng, Shenzhen (CN)

(73) Assignee: Tencent Technology (Shenzhen) Company Limited, Shenzhen, Guangdong (CN)

(*) Notice: Subject to any disclaimer, the term of this patent is extended or adjusted under 35 U.S.C. 154(b) by 0 days.

(21) Appl. No.: 15/034,363

(22) PCT Filed: Oct. 10, 2014

(86) PCT No.: PCT/CN2014/088283
§ 371 (c)(1),
(2) Date: May 4, 2016

(87) PCT Pub. No.: WO2015/067114
PCT Pub. Date: May 14, 2015

(65) Prior Publication Data
US 2016/0267278 A1 Sep. 15, 2016

(30) Foreign Application Priority Data
Nov. 8, 2013 (CN) .......................... 2013 1 0554402

(51) Int. Cl.
*G06F 11/00* (2006.01)
*G06F 21/57* (2013.01)
*G06F 21/55* (2013.01)

(52) U.S. Cl.
CPC .......... *G06F 21/577* (2013.01); *G06F 21/554* (2013.01); *G06F 2221/033* (2013.01); *G06F 2221/2119* (2013.01)

(58) Field of Classification Search
CPC .......................... G06F 21/577; G06F 2221/033
(Continued)

(56) References Cited

U.S. PATENT DOCUMENTS 8,800,040 B1 * 8/2014 Tan ..................... H04L 63/1408
709/224
8,949,990 B1 * 2/2015 Hsieh .................... G06F 21/577
726/22

(Continued)

FOREIGN PATENT DOCUMENTS

CN 101883024 A 11/2010
CN 101902470 A 12/2010
(Continued)

OTHER PUBLICATIONS

Shahriar et al., "Design and development of Anti-XSS proxy," 8th International Conference for Internet Technology and Secured Transactions (ICITST-2013) Year: 2013 pp. 484-489.*
(Continued)

*Primary Examiner* — Roderick Tolentino
(74) *Attorney, Agent, or Firm* — Harness, Dickey & Pierce, P.L.C.

(57) ABSTRACT

Disclosed are a method and apparatus for detecting a document object model (DOM) based cross-site scripting (XSS) vulnerability, an apparatus thereof, and a terminal are provided. The method includes: obtaining a set of parameter-value pairs from an original web address of a web page, where the set of parameter-value pairs comprises at least one parameter-value pair; replacing a parameter value in a parameter-value pair with feature code, to form a test web
(Continued)

address for the web page, where the feature code comprises malicious code that comprises a malicious character and is uniquely identified in a DOM tree of the web page; obtaining page content corresponding to the test web address; converting the page content, into the DOM tree; and detecting whether a XSS vulnerability exists in the parameter-value pair, based on the DOM tree and the feature code.

8 Claims, 5 Drawing Sheets

(58) Field of Classification Search
USPC .................................................. 726/22–25
See application file for complete search history.

(56) References Cited

U.S. PATENT DOCUMENTS

| | | | | |
|---|---|---|---|---|
| 9,021,593 | B2* | 4/2015 | Liu | G06F 21/53 |
| | | | | 707/999.003 |
| 2007/0162427 | A1* | 7/2007 | Yamaoka | H04L 63/1416 |
| 2008/0120722 | A1* | 5/2008 | Sima | H04L 63/168 |
| | | | | 726/25 |
| 2009/0119777 | A1* | 5/2009 | Jeon | H04L 63/1433 |
| | | | | 726/25 |
| 2012/0255023 | A1* | 10/2012 | Maor | G06F 21/56 |
| | | | | 726/25 |
| 2014/0157413 | A1* | 6/2014 | Amit | H04L 63/0245 |
| | | | | 726/23 |
| 2015/0095886 | A1* | 4/2015 | Tripp | G06F 11/3672 |
| | | | | 717/124 |
| 2015/0096033 | A1* | 4/2015 | Beskrovny | G06F 21/577 |
| | | | | 726/25 |

FOREIGN PATENT DOCUMENTS

| | | |
|---|---|---|
| CN | 102609649 A | 7/2012 |
| CN | 102663296 A | 9/2012 |

OTHER PUBLICATIONS

Salas et al., "Model-Based Security Vulnerability Testing," Software Engineering Conference, 2007. ASWEC 2007. 18th Australian Year: 2007 pp. 284-296.*
International Search Report and Written Opinion of the ISA, ISA/CN, Haidian District, Beijing, mailed Jan. 14, 2015.

* cited by examiner

METHOD, APPARATUS, TERMINAL AND MEDIA FOR DETECTING DOCUMENT OBJECT MODEL-BASED CROSS-SITE SCRIPTING ATTACK VULNERABILITY

This application is the US national phase of International Application No. PCT/CN2014/088283, filed on Oct. 10, 2014, which claims priority to Chinese patent application No. 201310554402.1, titled "METHOD AND APPARATUS FOR DETECTING DOCUMENT OBJECT MODEL BASED CROSS-SITE SCRIPTING VULNERABILITY", filed on Nov. 8, 2013 with the State Intellectual Property Office of the People's Republic of China, the entire content of each application is incorporated herein by reference.

TECHNICAL FIELD

The present disclosure relates to the field of networking technologies, and in particular to a method for detecting a Document Object Model (DOM) based Cross-Site Scripting (XSS) vulnerability and an apparatus thereof, and a terminal.

BACKGROUND

XSS vulnerabilities are the most common type of Internet vulnerabilities nowadays. XSS attacks may be triggered in various browsers such as IE, Chrome and FireFox, causing serious damages.

In general, XSS enables attackers to inject malicious code into web pages and trick users to access; when a user views the web page, the malicious code is executed, and the attacker steals user information or infects the user's computer with a Trojan horse and gains control of the computer remotely. Common reflected XSS has the obvious echo feature in the source code of the returned page, thus easy to detect. Unlike common reflected XSS, DOM based XSS is triggered when a browser executes JavaScript (simply referred to as JS) and changes the DOM tree of a page, and malicious code is not echoed in the source code of the returned page.

Conventional methods for DOM based XSS vulnerability detection can only find an XSS vulnerability when execution of inserted feature JS code is triggered, which is only possible when the feature JS code uses the same grammar as the context of the dynamic web page; therefore, numerous attempts need to be made with different types of feature JS code, significantly reducing vulnerability finding capability and detection efficiency due to the time required for each attempt of executing JS code.

SUMMARY

In view of this, a method for detecting a DOM based XSS vulnerability and an apparatus, and a terminal are provided according to the embodiments of the present disclosure.

In an aspect, a method for detecting a DOM based XSS vulnerability is provided, which includes:

obtaining a set of parameter-value pairs from an original web address of a web page, where the set of parameter-value pairs includes at least one parameter-value pair;

replacing a parameter value in a parameter-value pair with feature code, to form a test web address for the web page, where the feature code includes malicious code that includes a malicious character and can be uniquely identified in a DOM tree of the web page;

obtaining page content corresponding to the test web address;

converting the page content, into a DOM tree; and detecting whether an XSS vulnerability exists in the parameter-value pair, based on DOM tree and the feature code.

In another aspect, an apparatus for detecting a DOM based XSS vulnerability is provided, which includes:

an obtaining module, configured to obtain a set of parameter-value pairs from an original web address of a web page, where the set of parameter-value pairs includes at least one parameter-value pair;

a replacing module, configured to replace a parameter value in a parameter-value pair with feature code, to form a test web address for the web page, where the feature code includes malicious code that includes a malicious character and can be uniquely identified in a DOM tree of the web page;

where the obtaining module is further configured to obtain page content corresponding to the test web address;

a converting module, configured to convert the page content into a DOM tree; and a detecting module, configure to detect whether an XSS vulnerability exists in the parameter-value pair, based on the DOM tree and the feature code.

In another aspect, a terminal is further provided, which is provided with an apparatus for detecting a document object model based cross-site scripting vulnerability described above.

In another aspect, a non-transitory computer readable storage medium is further provided, storing computer executable instructions such that the method above for detecting a DOM based XSS vulnerability is performed when the executable instructions are executed on a computer.

The method and for detecting a DOM based XSS vulnerability and an apparatus thereof, and a terminal of the embodiments of the present disclosure can effectively find a DOM XSS vulnerability by simply searching for inserted feature code in a converted DOM tree, without the need of triggering execution of the feature code, which greatly improves vulnerability finding capability and detection efficiency.

BRIEF DESCRIPTION OF THE DRAWINGS

In order to more clearly illustrate the technical solutions in the embodiments of the present disclosure, the drawings used in the description of the embodiments are introduced briefly hereinafter. Clearly, the drawings described herein are only some of the embodiments of the present invention, and other drawings may be obtained by those skilled in the art based on these drawings without inventive effort.

DETAILED DESCRIPTION OF THE EMBODIMENTS

For a better understanding of the object, technical solutions, and advantages of the present disclosure, the embodiments of the present disclosure are further described in detail hereinafter, in conjunction with the drawings.

Figure 1:
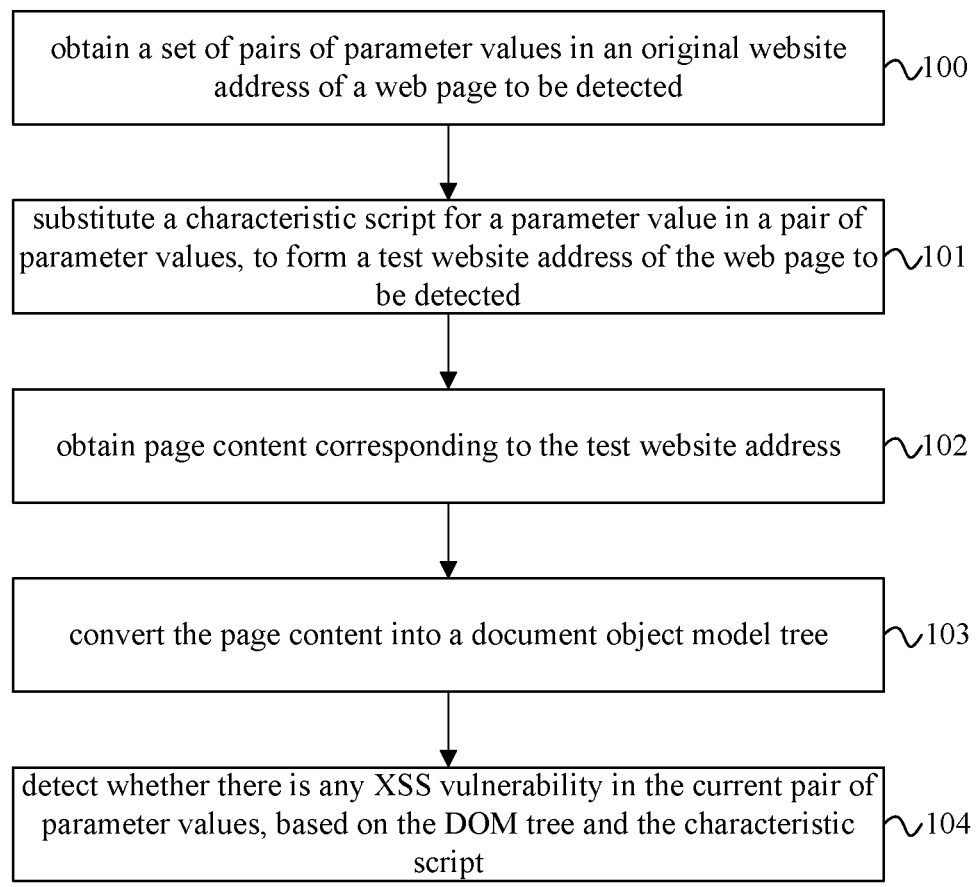
FIG. 1 is a flow chart of a method for detecting a DOM XSS vulnerability according to an embodiment of the present disclosure.

FIG. 1 is a flow chart of a method for detecting a DOM XSS vulnerability according to an embodiment of the present disclosure. The method for detecting a Document Object Model based Cross-Site Scripting vulnerability according to the embodiment is simply referred to as the method for detecting a DOM XSS vulnerability. As shown in FIG. 1, the method for detecting a DOM XSS vulnerability according to the embodiment may include the following steps 100 to 104.

In step 100, a set of parameter-value pairs are obtained from an original web address of a web page obtained.

In the embodiment, the set of parameter-value pairs includes at least one parameter-value pair.

In the embodiment, the web page may be a web page with XSS, such as a Common Gateway Interface (CGI) with parameters, or a static page without parameters. A part in the web address of the web page where a user can control the input may be regarded as a parameter-value pair of the web address, i.e., the target to be detected. For example, a parameter-value pair of a static page a.html may be a.html#XXX and a.html?XXX. A parameter-value pair of a dynamic page a.php?b=1 &c=2 may be b=XXX and c=XXX.

In step 101, a parameter value in a parameter-value pair is replaced with feature code, to form a test web address for the web page.

In the embodiment, the feature code may be malicious code that contains a malicious character and can be uniquely identified in the DOM tree of the web page. The feature code may also be referred to as a JS feature code. The malicious character may be a malicious character obtained according to a conventional method for XSS vulnerability detection, such as character<, character>, character ", character", character ', character' and character/.

For example, string XXX in the above parameter-value pair represents a parameter value to be replaced with the feature code. For example, <img src=x onerror=alert(/dom-xss/)/> is feature code that attempts to insert a label into the DOM tree of the web page. It should be noted that, a plurality of feature codes may be used, and each feature code is sequentially and independently detected. Clearly, as the number of feature codes increases, vulnerability finding capability is improved but overall detection efficiency is reduced; thus the number of feature codes needs to be strictly controlled while maintaining the vulnerability finding capability, to ensure detection efficiency. The embodiment uses one feature code, as an example to illustrate a technical solution of the present disclosure; those skilled in the art understand that any feature code can be detected with a similar solution, the details of which are therefore omitted herein.

In some exemplary implementations, feature code may be used to replace a parameter value for each parameter-value pair in the set of parameter-value pairs, to form a test web address for the web page. Testing may be done for all the parameter-value pairs one by one according to their orders in the original web address of the web page, ensuring that every parameter-value pair is tested; and multiple feature codes may be used in the testing of each parameter-value pair, to ensure detection efficiency. In the embodiment, the feature code may be set in advance according to empirical knowledge.

In step 102, page content corresponding to the test web address is obtained.

For example, page content corresponding to the test web address may be obtained from a server of the test web address.

In the embodiment, page content may refer to all the information included in the web page corresponding to a web address, including resources such as text and pictures. The page content corresponding to the test web address may refer to all the information included in the web page corresponding to the test web address.

In step 103, the page content is converted into a DOM tree.

A DOM tree is a tree-like representation of data and structures of page content; and page content is a way to express data and structures in a DOM tree. DOM tree and page content are two ways to represent data and structures, and can be converted into each other according to a correspondence therebetween. For example, in a specific conversion, all label nodes in the source code of page content may be shown according to parent-child relations between the label nodes, to obtain a DOM tree structure of the page content.

In step 104, it is detected whether an XSS vulnerability exists in the parameter-value pair, based on the DOM tree and the feature code.

For example, when <img src=x onerror=alert(/dom-xss/)/> is used as the feature code that attempts to insert an label to the DOM tree of the web page, the page content corresponding to the parameter-value pair of a.php?b=<img src=x onerror=alert(/dom-xss/)/>&c=2 may be requested from the server of the test web address, and the page content is converted into a DOM tree; then it is detected for each parameter-value pair whether an XSS vulnerability exists based on the DOM tree and the feature code <img src=x onerror=alert(/dom-xss/)/>.

In the embodiment, the entity that executes the method for detecting a DOM XSS vulnerability may be an apparatus for detecting the DOM XSS vulnerability. Specifically, the apparatus may be obtained through software integration, for example it may be a software integrated tool.

Based on the technical solution above, the method for detecting a DOM XSS vulnerability according to the embodiment of the present disclosure can effectively find a DOM XSS vulnerability by simply searching for inserted feature code in a converted DOM tree, without the need of triggering execution of the feature code, which greatly improves vulnerability finding capability and detection efficiency.

Furthermore, optionally, on the basis of the technical solution of the above embodiment, step 104 "detecting whether an XSS vulnerability exists in the parameter-value pair, based on the DOM tree and the feature code" may include: determining whether the DOM tree includes the feature code, and if so, determining that an XSS vulnerability exists in the parameter-value pair; if not, determining that no XSS vulnerability exists in the parameter-value pair.

For example, the detecting whether an XSS vulnerability exists in parameter b based on the DOM tree and feature code "<img src=x onerror=alert(/dom-xss/)/>" includes: detecting whether the DOM tree includes feature code "<img src=x onerror=alert(/dom-xss/)/>", and if the DOM tree includes the feature code, it is determined that an XSS vulnerability exists in parameter b; if the DOM tree does not include the feature code, it is determined that no XSS vulnerability exists in parameter b.

Optionally, on the basis of the above embodiments, step 102 "obtaining page content corresponding to the test web address" may include: requesting a server of the test web address for page content corresponding to the test web address; and receiving the page content provided by the server of the test web address.

Optionally, on the basis of the above embodiments, prior to step 100 "obtaining a set of parameter-value pairs from an original web address of a web page", the method may further include: receiving, an original web address of a web page inputted by a user via a human-machine interface module. For example, the apparatus for detecting a DOM XSS vulnerability may be provided with a human-machine interface module configured to receive an original web address of a web page inputted by the user.

Optionally, on the basis of the technical solutions of the above embodiments, the method may further include: when the DOM tree does not include the feature code, triggering execution of a button on the web page, updating the DOM tree in response to the triggered execution of the button, and detecting whether an XSS vulnerability exists in the parameter-value pair based on the updated DOM tree and the feature code; continuing to the next button until all buttons on the web page have been triggered; determining that no vulnerability exists in the web page if no vulnerability has been detected for all the buttons; otherwise, determining a vulnerability exists in the web page if a vulnerability has been detected for any button. In this way, the technical solutions of the present disclosure can detect more complicated DOM XSS vulnerabilities, for example, those that can only be triggered after a button on the returned page is clicked. Hence, the detection scope of DOM XSS vulnerabilities by the technical solutions of the present disclosure is further expanded.

All the optional measures in the above embodiments can be freely combined in various ways according to actual needs, to form optional technical solutions of the present invention, the details of which are therefore omitted herein.

Based on the technical solutions of the above embodiments, the method for detecting a DOM XSS vulnerability according to the embodiment of the present disclosure can effectively find a DOM XSS vulnerability by simply searching for inserted feature code in a converted DOM tree, without the need of triggering execution of the feature code, which greatly improves vulnerability finding capability and detection efficiency. Furthermore, the technical solutions of the above embodiment can also detect those more complicated DOM XSS vulnerabilities that can only be triggered after a button on the returned page is clicked, which further expands the detection scope of DOM XSS vulnerabilities, and improves vulnerability finding capability. In addition, the technical solutions of the above embodiments can not only detect DOM XSS vulnerabilities, but also effectively detect common reflected XSS vulnerabilities, resulting in a strong applicability.

Figure 2:
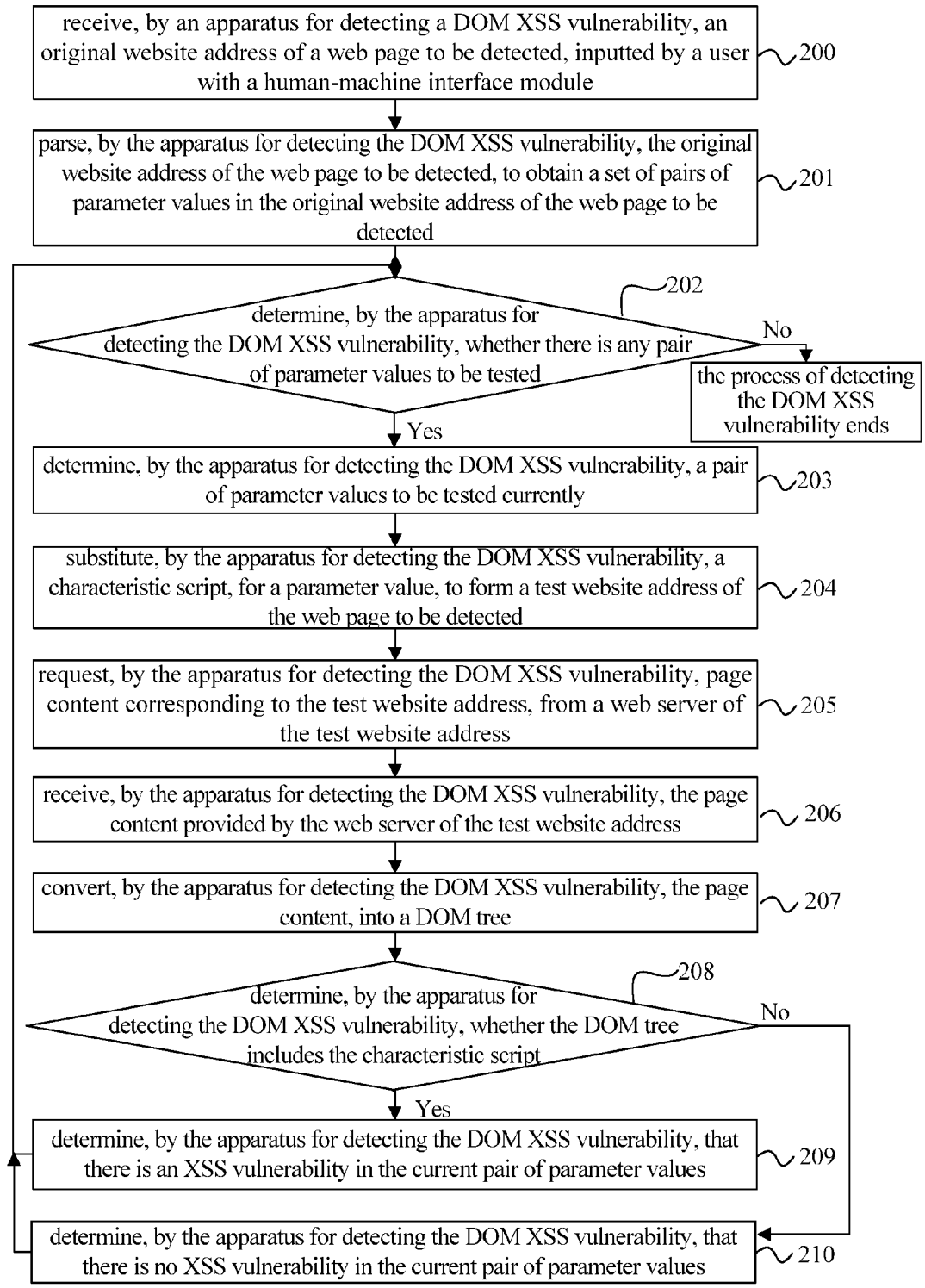
FIG. 2 is a flow chart of a method for detecting a DOM XSS vulnerability according to another embodiment of the present disclosure.

FIG. 2 is a flow chart of a method for detecting a DOM XSS vulnerability according to an embodiment of the present disclosure. The method for detecting a DOM XSS vulnerability according to the embodiment provides a more detailed technical solution of the present disclosure on the basis of the technical solutions of the embodiment illustrated in FIG. 1 and its optional measures. As shown in FIG. 2, the method for detecting a DOM XSS vulnerability according to the embodiment may include the following steps 200 to 210.

In step 200, an apparatus for detecting a DOM XSS vulnerability receives an original web address of a web page inputted by a user via a human-machine interface module; and step 201 is performed.

The human-machine interface module in the embodiment may be a touch screen, a keyboard, etc. For example, when the apparatus for detecting a DOM XSS vulnerability is provided with a touch screen, the original web address of the web page may be inputted via the touch screen. If the apparatus for detecting a DOM XSS vulnerability is provided with a keyboard, the original web address of the web page may be inputted via the keyboard.

In step 201, the apparatus for detecting a DOM XSS vulnerability parses the original web address of the web page, to obtain a set of parameter-value pairs in the original web address of the web page; and step 202 is performed.

Specifically, the apparatus for detecting a DOM XSS vulnerability analyzes the original web address of the web page, and extracts all parameter-value pairs included in the original web address of the web page, the extracted parameter-value pairs constituting the set of parameter-value pairs.

In step 202, the apparatus for detecting a DOM XSS vulnerability determines whether there is a parameter-value pair to be tested, and if so, step 203 is performed; if not, the process of detecting a DOM XSS vulnerability ends.

For example, the apparatus for detecting a DOM XSS vulnerability may specifically determine whether the set of parameter-value pairs is an empty set. When it is an empty set, i.e., there is no parameter-value pair to be tested, the process of detecting a DOM XSS vulnerability ends. When it is not an empty set, step 203 is performed and the process continues.

In step 203, the apparatus for detecting a DOM XSS vulnerability determines a parameter-value pair to be tested currently; and step 204 is performed.

In order to ensure that every parameter-value pair in the set of parameter-value pairs is tested, testing may be done for all the parameter-value pairs one by one according to their orders in the original web address of the web page. In the first testing, the first parameter-value pair in the original web address of the web page may be obtained; and subsequently, the other parameter-value pairs are selected one by one according to their orders. When there is no more parameter-value pair, i.e., all the parameter-value pairs in the set of parameter-value pairs in the original web address of the web page have been tested, the process of detecting a DOM XSS vulnerability ends.

In step 204, the apparatus for detecting a DOM XSS vulnerability replaces a parameter value with feature code, to form a test web address for the web page; and step 205 is performed.

The feature code may be malicious code that contains a malicious character and can be uniquely identified in the DOM tree of the web page. The feature code may also be referred to as a JS feature code. For more details, please refer the description in the related embodiments above.

In step 205, the apparatus for detecting a DOM XSS vulnerability requests page content corresponding to the test web address from a server of the test web address; and step 206 is performed.

Because page content corresponding to a web address is stored in a server of the website, the apparatus for detecting a DOM XSS vulnerability requests page content corresponding to the test web address from the server of the test web address when it wants to obtain the page content.

In step 206, the apparatus for detecting a DOM XSS vulnerability receives the page content responded by the server of the test web address; and step 207 is performed.

Upon receipt of the request by the apparatus for detecting a DOM XSS vulnerability, the server of the test web address returns a page content response to the apparatus for detecting a DOM XSS vulnerability. Correspondingly, the apparatus for detecting a DOM XSS vulnerability receives the page content.

In step 207, the apparatus for detecting a DOM XSS vulnerability converts the page content into a DOM tree; and step 208 is performed.

Upon receipt of the page content, the apparatus for detecting a DOM XSS vulnerability converts data and structures of the page content into a corresponding DOM tree. For example, in a specific conversion, all label nodes in the source code of page content may be shown according to parent-child relations between the label nodes, to obtain a DOM tree structure of the page content.

In step 208, the apparatus for detecting a DOM XSS vulnerability determines whether the DOM tree includes the feature code, and step 209 is performed if the DOM tree includes the feature code; otherwise, step 210 is performed.

The apparatus for detecting a DOM XSS vulnerability detects all information in the DOM tree, to determine whether the DOM tree includes the feature code.

In step 209, the apparatus for detecting a DOM XSS vulnerability determines that an XSS vulnerability exists in the parameter-value pair; and step 202 is performed.

When the apparatus for detecting a DOM XSS vulnerability detects all information in the DOM tree and determines the DOM tree includes the feature code, it determines that an XSS vulnerability exists in the parameter-value pair.

In step 210, the apparatus for detecting a DOM XSS vulnerability determines that no XSS vulnerability exists in the parameter-value pair; and step 202 is performed.

When the apparatus for detecting a DOM XSS vulnerability detects all information in the DOM tree and determines the DOM tree does not include the feature code, it determines that no XSS vulnerability exists in the parameter-value pair. Then, the next parameter-value pair may be detected in a manner similar to the above.

The embodiment uses one feature code, as an example for the purpose of illustration only; in practical applications, multiple feature codes may be set in advance, and each parameter-value pair may be tested using the multiple feature codes. In the detection results from multiple feature codes, as long as one detection result of one feature code shows an XSS vulnerability exists in the parameter-value pair, it is determined that an XSS vulnerability exists in the parameter-value pair. If, in the detection results from multiple feature codes, every detection result shows no XSS vulnerability exists in the parameter-value pair, it is determined that no XSS vulnerability exists in the parameter-value pair.

Moreover, for more complicated DOM XSS vulnerabilities, for example, those that can only be triggered after a button on the returned page is clicked, after step 208 where the apparatus for detecting a DOM XSS vulnerability determines that the DOM tree does not include the feature code, and prior to step 210, the apparatus for detecting a DOM XSS vulnerability may trigger execution of a button on the web page, and steps 205 to 208 are performed. If, after the triggering of the button, the apparatus for detecting a DOM XSS vulnerability determines that the DOM tree still does not include the feature code, the apparatus for detecting a DOM XSS vulnerability continues to the next button until all buttons on the web page have been triggered. If the DOM tree still does not include the feature code then, step 210 performed, i.e., the apparatus for detecting a DOM XSS vulnerability determines that no XSS vulnerability exists in the parameter-value pair. Based on this measure, the technical solution of the embodiment of the present disclosure can detect more complicated DOM XSS vulnerabilities, further improving vulnerability finding capability.

The technical solution of the embodiment can effectively find a DOM XSS vulnerability by simply searching for inserted feature code in a converted DOM tree, without the need of triggering execution of the feature code, which greatly improves vulnerability finding capability and detection efficiency. Furthermore, the technical solution of the above embodiment can also detect those more complicated DOM XSS vulnerabilities that can only be triggered after a button on the returned page is clicked, which further expands the detection scope of DOM XSS vulnerabilities, and improves vulnerability finding capability. In addition, the technical solution of the above embodiment can not only detect DOM XSS vulnerabilities, but also effectively detect common reflected XSS vulnerabilities, resulting in a strong applicability.

Figures 3, 4:
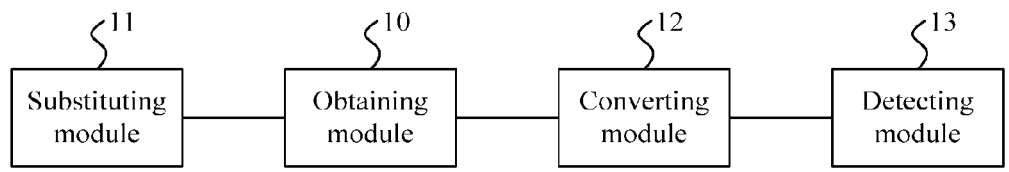
FIG. 3 illustrates an example of a detection result of a method for detecting a DOM XSS vulnerability according to an embodiment of the present disclosure.
FIG. 4 is a schematic structural diagram of an apparatus for detecting a DOM XSS vulnerability according to an embodiment of the present disclosure.

In actual tests, the technical solution of the embodiment according to the present disclosure has been used to scan tens of thousands of websites and found DOM XSS vulnerabilities in a total of thousands of pages, with a false positive rate of zero. Therefore, it should be noted that the technical solutions of the embodiments according to the present disclosure can be used to detect any website and web page. For example, FIG. 3 illustrates an example of a detection result of a method for detecting a DOM XSS vulnerability according to an embodiment of the present disclosure. As shown in FIG. 3, the technical solution for detecting a DOM XSS vulnerability finds a DOM XSS vulnerability in a page, specifically, <iframe/onload=alert(/xss/)></iframe> is the feature code used in the embodiment.

FIG. 4 is a schematic structural diagram of an apparatus for detecting a DOM XSS vulnerability according to an embodiment of the present disclosure. As shown in FIG. 4, the apparatus for detecting a DOM XSS vulnerability according to the embodiment may include an obtaining module 10, a replacing module 11, a converting module 12 and a detecting module 13.

The obtaining module 10 is configured to obtain a set of parameter-value pairs from an original web address of a web page, where the set of parameter-value pairs includes at least one parameter-value pair. The replacing module 11 is connected to the obtaining module 10, and is configured to replace a parameter value in a parameter-value pair in the set of parameter-value pairs obtained by the obtaining module 10 with feature code, to form a test web address for the web page. The feature code may be malicious code that contains a malicious character and can be uniquely identified in the DOM tree of the web page. The obtaining module 10 is further configured to obtain page content corresponding to the test web address formed by the replacing module 11 from replacing. The converting module 12 is connected to the obtaining module 10, and is configured to convert the page content obtained by the obtaining module 10 into a DOM tree. The detecting module 13 is connected to the converting module 12, and is configure to detect whether an XSS vulnerability exists in the parameter-value pair, based on the DOM tree obtained by the converting module 12 from converting, and the feature code. The feature code may be set in advance.

The apparatus for detecting a DOM XSS vulnerability according to the embodiment may realize DOM XSS vulnerability detection by the above modules based on a mechanism the same as that of the related method embodiments in the above. For the details, please refer to the descriptions of the above embodiments.

Based on the above modules, the apparatus for detecting a DOM XSS vulnerability according to the embodiment can effectively find a DOM XSS vulnerability by simply searching for inserted feature code in a converted DOM tree, without the need of triggering execution of the feature code, which greatly improves vulnerability finding capability and detection efficiency.

Figure 5:
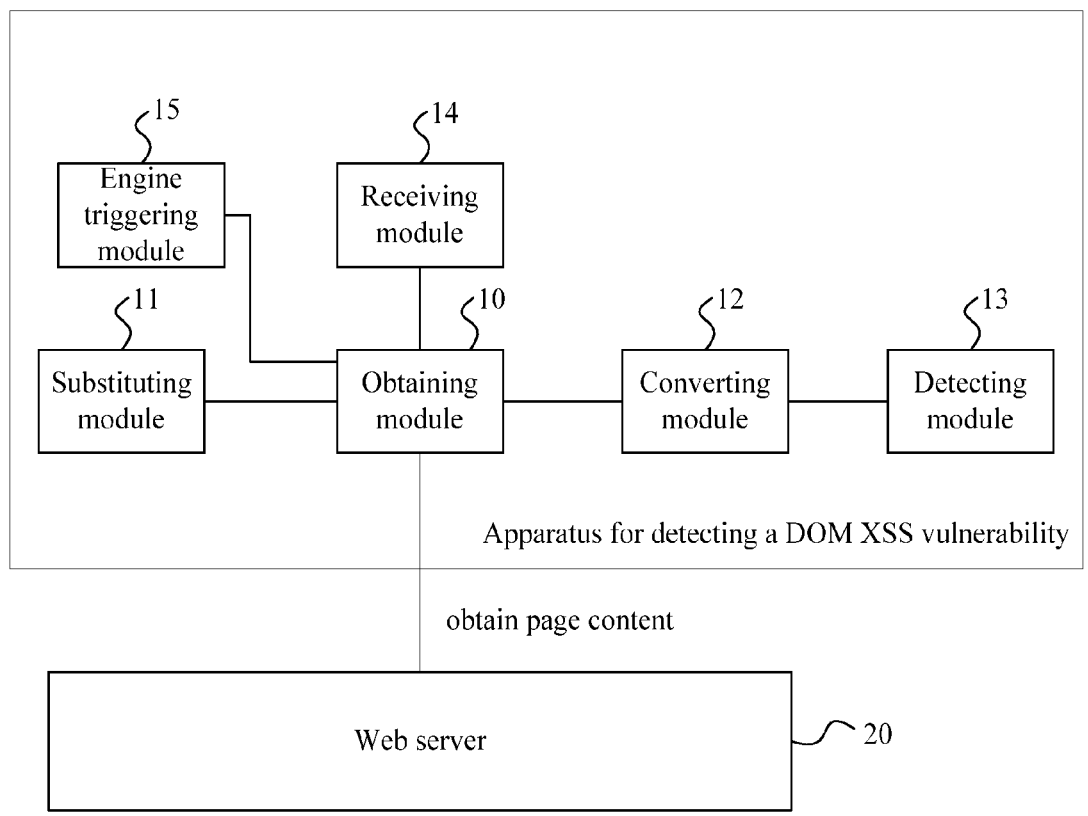
FIG. 5 is a schematic structural diagram of an apparatus for detecting a DOM XSS vulnerability according to another embodiment of the present disclosure.

FIG. 5 is a schematic structural diagram of an apparatus for detecting a DOM XSS vulnerability according to another embodiment of the present disclosure. As shown in FIG. 5, the following optional measures are included in the embodiment on the basis of the embodiment illustrated in FIG. 4.

As shown in FIG. 5, the detecting module 13 in the apparatus for detecting a DOM XSS vulnerability according to the embodiment is specifically configured to determine whether the DOM tree includes the feature code, and determine that an XSS vulnerability exists in the parameter-value pair when the DOM tree includes the feature code; and determine that no XSS vulnerability exists in the parameter-value pair when the DOM tree does not include the feature code.

Figure 6:
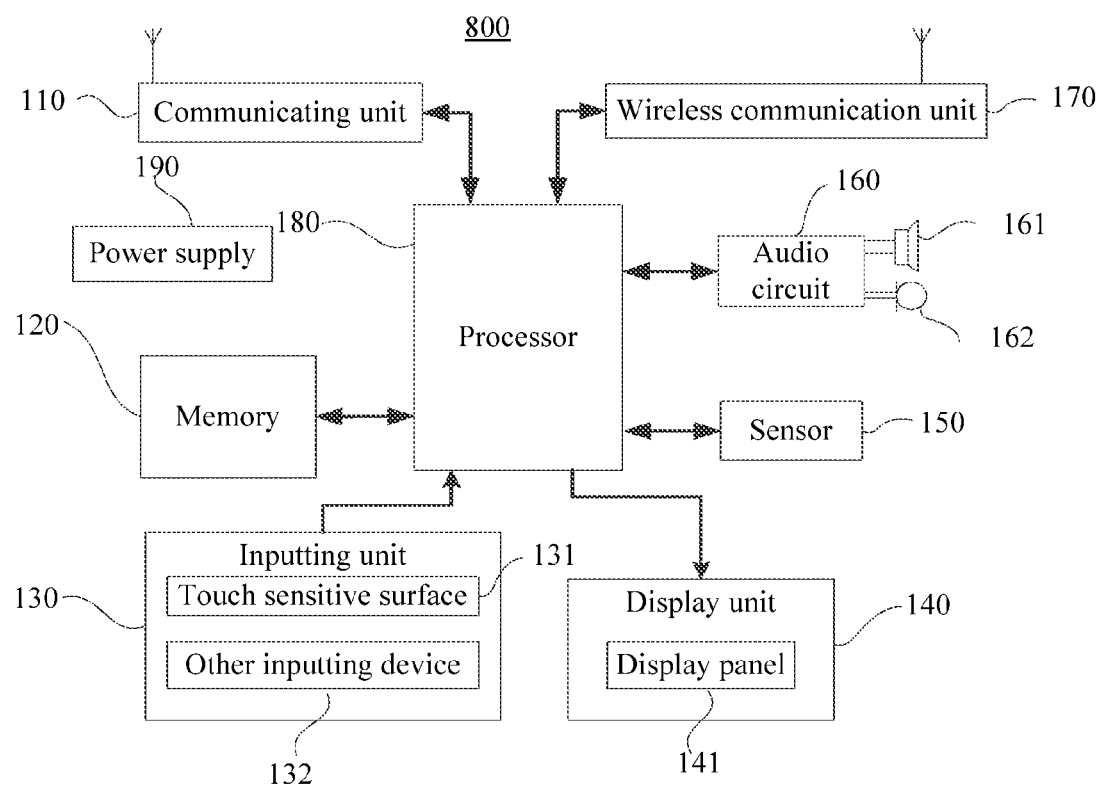
FIG. 6 is a schematic structural diagram of a terminal according to an embodiment of the present disclosure.

Optionally, as shown in FIG. 5, the obtaining module 10 in the apparatus for detecting a DOM XSS vulnerability according to the embodiment is specifically configured to request page content corresponding to the test web address from a server 20 of the test web address, and receive the page content responded by the server 20 of the test web address. FIG. 6 also shows the server 20 interacting with the obtaining module 10. The server may be a server of a website, and page content of all web pages on the website may be stored in the server 20. When other device or module requests the server for the page content of a web page, the server responds the requesting device or module with the requested page content. Upon receipt of the request for the page content corresponding to the test web address sent by the obtaining module 10, the server 20 obtains the page content corresponding to the test web address and sends a response to the obtaining module 10, to send the page content corresponding to the test web address to the obtaining module 10.

Optionally, as shown in FIG. 5, the apparatus for detecting a DOM XSS vulnerability according to the embodiment may further include a receiving module 14. The receiving module 14 is configured to receive the original web address of the web page inputted by a user with a human-machine interface module. Correspondingly, the obtaining module 10 is connected to the receiving module 14, and is configured to obtain the set of parameter-value pairs in the original web address of the web page received by the receiving module 14.

Optionally, as shown in FIG. 5, the apparatus for detecting a DOM XSS vulnerability according to the embodiment may further include an engine triggering module 15. The engine triggering module 15 is may be a backup, auxiliary module, according to the embodiment of the present disclosure. For those DOM XSS vulnerabilities that can only be triggered after a button on the returned page is clicked, the DOM tree generated from the originally returned page does not include the feature code; and when the detecting module 13 determines that the DOM tree does not include the feature code, the engine triggering module 15 triggers execution of a button on the web page, which may trigger the DOM XSS vulnerability. Then, the obtaining module 10 obtains page content corresponding to the test web address after the button is triggered by the engine triggering module 15. The obtaining module 10 is connected to the engine triggering module 15. Then, the obtaining module 10 obtains the page content corresponding to the test web address formed by the replacing module 11 from replacing; the converting module 12 converts the page content obtained by the obtaining module 10 into a DOM tree; and the detecting module 13 detects whether an XSS vulnerability exists in the parameter-value pair, based on the DOM tree obtained by the converting module 12 from converting and the feature code. If, after the button is triggered, the detecting module 13 still determines that the DOM tree does not include the feature, then the engine triggering module 15 triggers execution of the next button on the web page. The process continues, until all buttons are triggered and no feature code is detected in the DOM tree by the detecting module 13, it is determined that no XSS vulnerability exists in the parameter-value pair. Based on this measure, the technical solution of the embodiment of the present disclosure can detect more complicated DOM XSS vulnerabilities, further improving vulnerability finding capability.

All the optional measures in the above embodiments can be freely combined in various ways according to actual needs, to form optional technical solutions of the present invention, the details of which are therefore omitted herein.

The apparatus for detecting a DOM XSS vulnerability according to the embodiment may realize DOM XSS vulnerability detection by the above modules based on a mechanism the same as that of the related method embodiments in the above. For the details, please refer to the descriptions of the above embodiments.

The apparatus for detecting a DOM XSS vulnerability according to the embodiment can effectively find a DOM XSS vulnerability by simply searching for inserted feature code in a converted DOM tree, without the need of triggering execution of the feature code, which greatly improves vulnerability finding capability and detection efficiency. Furthermore, the technical solution of the above embodiment can also detect those more complicated DOM XSS vulnerabilities that can only be triggered after a button on the returned page is clicked, which further expands the detection scope of DOM XSS vulnerabilities, and improves vulnerability finding capability. In addition, the technical solution of the above embodiment can not only detect DOM XSS vulnerabilities, but also effectively detect common reflected XSS vulnerabilities, resulting in a strong applicability.

The apparatus for detecting a DOM XSS vulnerability according to the embodiment may be set on the browser client side, and used as an engine of a browser. Alternatively, it may be set in a terminal and implemented independently.

FIG. 6 is a schematic structural diagram of a terminal according to an embodiment of the present disclosure. As shown in FIG. 6, the terminal may be used to implement the method for detecting a DOM XSS vulnerability according to the above embodiments.

A terminal device 800 may include a communicating unit 110, a memory 120 including one or more computer readable storage media, an inputting unit 130, a display unit 140, a sensor 150, an audio circuit 160, a WiFi (Wireless Fidelity) module 170, a processor 180 including one or more processing cores, a power supply 190, and so on. It can be understood by those skilled in the art that, the structure of the terminal device illustrated in FIG. 6 is not limitation to the terminal device. The technical solution according to the present disclosure may include more or less components as compared with the components illustrated in FIG. 6, or have some components combined, or use a different arrangement of the components.

The communicating unit 110 may be configured to receive and send information, or to receive and send signals in a call. The communicating unit 110 may be a network communication device, such as a RF (Radio Frequency) circuit, a router or a modem. Particularly, in the case that the communicating unit 110 is a RF circuit, it sends downlink information of a base station to one or more processors 180 for processing after downlink information of the base station is received; and sends uplink data to the base station. Usually, the RF circuit used as the communicating unit includes, but is not limited to, an antenna, at least one amplifier, a tuner, one or more oscillators, a subscriber identity module (SIM) card, a transceiver, a coupler, a LNA (Low Noise Amplifier), a duplexer, and so on. In addition, the communicating unit 110 may also communicate with other devices by means of wireless communication or network. The wireless communication may uses any communication standard or protocol, which includes, but is not limited to, GSM (Global System of Mobile communication), GPRS (General Packet Radio Service), CDMA (Code Division Multiple Access), WCDMA (Wideband Code Division Multiple Access), LTE (Long Term Evolution), email, SMS (Short Messaging Service), and so on. The memory 120 may be configured to store software programs and modules, and the processor 180 performs functional applications and data processing by running the software programs and modules stored in the memory 120. The memory 120 may mainly include a program storing region and a data storing region, where the program storing region may store an operating system, an application program which is needed by at least one function (such as an audio playing function and an image playing function); and the data storing region may store data established based on use of the terminal device 800 (such as audio data and a phone book). In addition, the memory 120 may include a high speed random access memory, and may also include a non-volatile memory such as at least one magnetic disk storage device or a flash memory, or other volatile solid-state memory. Correspondingly, the memory 120 may further include a memory controller configured to provide access to the memory 120 for the processor 180 and the inputting unit 130.

The inputting unit 130 may be configured to receive an inputted number or character information, and generate a signal related to user setting and function controlling, which is inputted with a keyboard, a mouse, an operating rod or a trackball, or an optical input. Specifically, the inputting unit 130 may include a touch sensitive surface 131 and other inputting device 132. The touch sensitive surface 131, also referred to as a touch screen or a touch panel, may collect touch operations of a user which are performed on or near to it (such as operations performed by the user on the touch sensitive surface 131 or near to the touch sensitive surface 131, with a proper object or accessory such as a finger or a stylus), and drive a corresponding connecting device based on a preset program. Optionally, the touch sensitive surface 131 may include a touch detecting device and a touch controlling device. The touch detecting device detects a touch location of the user, detects a signal generated due to an touch operation, and sends the signal to the touch controlling device; the touch controlling device receives touch information from the touch detecting device, converts it into coordinates of a touch point, sends to the processor 180, and receive an instruction from the processor 180 and execute it. In addition, the touch sensitive surface 131 may be resistive, capacitive, infrared or surface acoustic, and so on. In addition to the touch sensitive surface 131, the inputting unit 130 may further include the other inputting device 132. Specifically, the other inputting device 132 may include, but is not limited to, one or more of a physical keyboard, a function button (such as a volume controlling button or a switch button), a trackball, a mouse, an operating rod and so on.

The display unit 140 may be configured to display information inputted by the user or provided for the user, and various graphic user interfaces of the terminal device 800. The graphic user interfaces may consist of graphs, text, icons, videos and any combination thereof. The display unit 140 may include a display panel 141. Optionally, the display panel 141 may be configured in a form of LCD (Liquid Crystal Display), or OLED (Organic Light-Emitting Diode) and so on. Furthermore, the touch sensitive surface 131 may cover the display panel 141, and in a case that the touch sensitive surface 131 detects the touch operation on or near to it, it sends the touch operation to the processor 180 to determine a type of a touch event, then the processor 180 provides a corresponding visual output on the display panel 141 based on the type of touch event. In FIG. 6, although the touch sensitive surface 131 and the display panel 141 are used as two individual components to realize an inputting function and an outputting function, the touch sensitive surface 131 and the display panel 141 may be integrated to realize the inputting function and the outputting function in some embodiments.

The terminal device 800 may further include the at least one sensor 150, such as a light sensor, a motion sensor and other sensor. Specifically, the light sensor may include an ambient light sensor and a proximity sensor, the ambient light sensor may adjust brightness of the display panel 141 based on brightness of ambient light, and the proximity sensor may close the display panel 141 or backlight in a case that the terminal device 800 moves to an ear. As one of motion sensors, a gravity acceleration sensor may detect magnitude of an accelerated rate in each of directions (there are usually three axes), detect magnitude and a direction of gravity while at rest, and be applied to an application which recognize a gesture of the mobile phone (such as switching between portrait and landscape orientation, a related game or magnetometer calibration) and to a function related to vibration recognition (such as a pedometer or a click); and other sensor which may be provided for the terminal device 800, such as a gyroscope, a barometer, a hygrometer, a thermometer or an infrared sensor, is not described herein.

The audio circuit 160, a speaker 161 and a microphone 162 may provide an audio interface between the user and the terminal device 800. The audio circuit 160 may send a signal, converted from received audio data, to the speaker 161, and then the speaker 161 converts it into an audio signal for outputting; on the other hand, the microphone 162 converts a collected audio signal to an electrical signal, the electrical signal is received by the audio circuit 160 and then converted into audio data, and after the audio data is processed by the processor 180, the audio data is sent to another terminal device via the RF circuit 110, or the audio data is outputted to the memory 120 for further processing. The audio circuit 160 may further include a headphone jack, so as to provide communications between a peripheral headphone and the terminal device 800.

In order to implement wireless communications, the terminal device may be provided with a wireless communication unit 170. The wireless communication unit 170 may be a WiFi module. WiFi belongs to a short-distance wireless transmission technology, the terminal device 800 may help the user receive and send emails, browse a webpage, and access to streaming media, with the wireless communication unit 170, and it provides wireless broadband internet access for the user. Although the wireless communication unit 170 is illustrated in FIG. 6, it can be understood that, the wireless communication unit 170 is not a necessary constituent of the terminal device 800, and may be omitted based on requirements without changing essence of the present disclosure.

The processor 180 is a control center of the terminal device 800, which connects each part of the mobile phone with interfaces and circuits, and performs the functions of the terminal device 800 and the data processing, by running or executing the software programs or modules stored in the memory 120 and calling data stored in the memory 120, thereby realizing overall monitoring of the mobile phone. Optionally, the processor 180 may include one or more processing cores; preferably, the processor 180 may integrate an application processor and a modem processor, the application processor is mainly configured to process operating systems, user interfaces and applications, and the modem processor is mainly configured to process wireless communications. It can be understood that the modem processor may not be integrated into the processor 180.

The terminal device 800 further includes the power supply 190 (such as a battery) configured to power all the components, Preferably, the power supply may be logically connected with the processor 180 via a power supply management system, so that management of functions such as charging, discharging and power managing, can be realized with the power supply management system. The power supply 190 may further include one or more direct current or alternating current power supplies, a rechargeable system, a power fault detection circuit, a power adapter or inverter, a power status indicator, and so on.

Not shown in the figure, however, the terminal device 800 may further include a camera, a bluetooth module, and so on, which is not described here. Specifically, in the embodiment, the display unit in the terminal device is a touch screen display. The terminal device further includes the memory and one or more programs, where the one or more programs are stored in the memory. The terminal device is configured to implement, by one or more processors, the one or more programs including instructions for performing the following operations: obtaining, a set of parameter-value pairs, from an original web address of a web page, where the set of parameter-value pairs includes at least one parameter-value pair; replacing a parameter value in a parameter-value pair with feature code, to form a test web address for the web page; where the feature code includes malicious code that contains a malicious character and can be uniquely identified in the DOM tree of the web page; obtaining page content corresponding to the test web address; converting the page content into a DOM tree; and detecting whether an XSS vulnerability exists in the parameter-value pair, based on the DOM tree and the feature code.

Optionally, the memory is further configured to store the following instructions: determining whether the DOM tree includes the feature code, and determining that an XSS vulnerability exists in the parameter-value pair when the DOM tree includes the feature code; and determining that no XSS vulnerability exists in the parameter-value pair when the DOM tree does not include the feature code.

Optionally, the memory is further configured to store the following instructions: requesting a server of the test web address for the page content corresponding to the test web address; and receiving the page content responded by the server of the test web address.

Optionally, the memory is further configured to store the following instruction: receiving the original web address of the web page inputted by a user via a human-machine interface module.

Optionally, the memory is further configured to store the following instructions: when the DOM tree does not include the feature code, triggering execution of a button on the web page; obtaining page content corresponding to the test web address; converting the page content into a DOM tree; and detecting whether an XSS vulnerability exists in the parameter-value pair, based on DOM tree and the feature code.

It should be noted that, the triggering and detection of a DOM XSS vulnerability by the apparatus for detecting a DOM XSS vulnerability according to the embodiment is illustrated above by an example of how the functional modules are divided; in practical applications, the above functions may be assigned to different functional modules according to actual needs, that is, the internal structure of the apparatus may be divided into functional modules in a different way, to implement all or some of the functions described above. In addition, the apparatus for detecting a DOM XSS vulnerability and the method for detecting a DOM XSS vulnerability according to the above embodiments are covered by the same concept, and for more details of the apparatus, please refer to the description of the method embodiments for specific implementations.

The sequence of the above embodiments of the present disclosure is only used for description, and does not represent a preference to the embodiments.

It can be understood by those skilled in the art that, all or some of the steps in the above embodiments may be implemented by hardware, or by hardware instructed by a program. The program may be stored in a computer readable storage medium, and the above storage medium may be a read-only memory, a magnetic disk or an optical disk, and so on.

The above are only preferred embodiments of the present disclosure, and are not limitation to the present disclosure. Changes, equivalents and improvements made within the spirit and principle of the present disclosure, shall fall within the protection scope of the present disclosure.

The invention claimed is:

1. A method for detecting a document object model based cross-site scripting vulnerability, comprising:
    obtaining a set of parameter-value pairs from an original web address of a web page, wherein the set of parameter-value pairs comprises at least one parameter-value pair;
    replacing a parameter value in a parameter-value pair with feature code, to form a test web address for the web page, wherein the feature code comprises malicious code that comprises a malicious character and is uniquely identified in a document object model tree of the web page;
    obtaining page content corresponding to the test web address by: requesting a web server of the test web address for page content corresponding to the test web address; and receiving the page content responded by the web server of the test web address;
    converting the page content, into the document object model tree; and detecting whether a cross-site scripting vulnerability exists in the parameter-value pair, based on the document object model tree and the feature code by:

determining whether the document object model tree comprises the feature code;

determining that a cross-site scripting vulnerability exists in the parameter-value pair if the document object model tree comprises the feature code;

determining that no cross-site scripting vulnerability exists in the parameter-value pair if the document object model tree does not comprise the feature code; and in a case that the document object model tree does not comprise the feature code:

triggering execution of a button on the web page;

updating the document object model tree; and detecting whether a cross-site scripting vulnerability exists in the parameter-value pair based on the updated document object model tree and the feature code.

2. The method according to claim 1, further comprising: receiving the original web address of the web page inputted by a user via a human-machine interface module.

3. The method according to claim 1, further comprising: receiving the original web address of the web page inputted by a user via a human-machine interface module.

4. An apparatus for detecting a document object model based cross-site scripting comprising a processor and a memory having processor-executable instructions stored therein, and the instructions when executed by the processor, configure the processor to:

obtain a set of parameter-value pairs from an original web address of a web page, wherein the set of parameter-value pairs comprises at least one parameter-value pair;

replace a parameter value in a parameter-value pair with feature code, to form a test web address for the web page, wherein the feature code comprises malicious code that comprises a malicious character and is uniquely identified in a document object model tree of the web page;

obtain page content corresponding to the test web address, wherein the processor is further configured to:

request a web server of the test web address for page content corresponding to the test web address; and receive the page content responded by the web server of the test web address;

convert the page content into the document object model tree; and detect whether a cross-site scripting vulnerability exists in the parameter value pair, based on the document object model tree and the feature code, wherein the processor is further configured to: determine whether the document object model tree comprises the feature code;

determine that a cross-site scripting vulnerability exists in the parameter-value pair if the document object model tree comprises the feature code;

determine that no cross-site scripting vulnerability exists in the parameter-value pair if the document object model tree does not comprise the feature code; and in a case that the document object model tree does not comprise the feature code:

triggering execution of a button on the web page;

updating the document object model tree; and detecting whether a cross-site scripting vulnerability exists in the parameter-value pair based on the updated document object model tree and the feature code.

5. The apparatus according to claim 4, wherein the processor is further configured:

to receive the original web address of the web page inputted by a user via a human-machine interface module.

6. The apparatus according to claim 4, wherein the processor is further configured: to receive the original web address of the web page inputted by a user via a human-machine interface module.

7. The apparatus according to claim 4, wherein the processor is further configured: to trigger execution of a button on the web page when the document object model tree does not comprise the feature code; and to update the document object model tree in response to the triggered execution of the button.

8. A non-transitory computer readable storage medium, storing computer executable instructions such that the following steps are performed when the executable instructions are executed on a computer:

obtaining a set of parameter-value pairs from an original web address of a web page, wherein the set of parameter-value pairs comprises at least one parameter-value pair;

replacing a parameter value in a parameter-value pair with feature code, to form a test web address for the web page, wherein the feature code comprises malicious code that comprises a malicious character and is uniquely identified in a document object model tree of the web page;

obtaining page content corresponding to the test web address by: requesting a web server of the test web address for page content corresponding to the test web address; and receiving the page content responded by the web server of the test web address;

converting the page content into the document object model tree; and detecting whether a cross-site scripting vulnerability exists in the parameter-value pair, based on the document object model tree and the feature code by:

determining whether the document object model tree comprises the feature code;

determining that a cross-site scripting vulnerability exists in the parameter-value pair if the document object model tree comprises the feature code;

determining that no cross-site scripting vulnerability exists in the parameter-value pair if the document object model tree does not comprise the feature code; and in a case that the document object model tree does not comprise the feature code:

triggering execution of a button on the web page;

updating the document object model tree; and detecting whether a cross-site scripting vulnerability exists in the parameter-value pair based on the updated document object model tree and the feature code.

* * * * *